US012347913B2

(12) United States Patent
Bartlett et al.

(10) Patent No.: US 12,347,913 B2
(45) Date of Patent: Jul. 1, 2025

(54) WAFFLE IRON FILTER ARRANGEMENT FOR HIGH-FREQUENCY SIGNALS

(71) Applicant: Tesat-Spacecom GmbH & Co. KG, Backnang (DE)

(72) Inventors: Chad Bartlett, Kiel (DE); Christian Arnold, Backnang (DE); Michael Höft, Kiel (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 196 days.

(21) Appl. No.: 18/032,725

(22) PCT Filed: Oct. 21, 2021

(86) PCT No.: PCT/EP2021/079211
§ 371 (c)(1),
(2) Date: Apr. 19, 2023

(87) PCT Pub. No.: WO2022/084449
PCT Pub. Date: Apr. 28, 2022

(65) Prior Publication Data

US 2023/0395961 A1 Dec. 7, 2023

(30) Foreign Application Priority Data

Oct. 21, 2020 (DE) ........................ 102020127767.9

(51) Int. Cl.
*H01P 1/211* (2006.01)

(52) U.S. Cl.
CPC .................................. *H01P 1/211* (2013.01)

(58) Field of Classification Search
CPC ...................................................... H01P 1/211
(Continued)

(56) References Cited

U.S. PATENT DOCUMENTS

| | | |
|---|---|---|
| 5,065,123 A | 11/1991 | Heckaman et al. |
| 5,124,677 A | 6/1992 | Heckaman et al. |

(Continued)

FOREIGN PATENT DOCUMENTS

| | | |
|---|---|---|
| JP | H06334408 A | 12/1994 |
| WO | 2018108733 A1 | 6/2018 |

OTHER PUBLICATIONS

International Search Report for PCT/EP2021/079211 mailed Jan. 31, 22. 4 pgs.

(Continued)

*Primary Examiner* — Jorge L Salazar, Jr.
(74) *Attorney, Agent, or Firm* — Lerner David LLP

(57) ABSTRACT

A filter arrangement for high frequency signals, HF signals, is described. The filter arrangement includes a housing in which there is a cavity that extends in the longitudinal direction of the housing. The waffle-iron arrangement is arranged in the cavity and includes a carrier plate having a plurality of recesses, wherein there is an electrically conductive material arranged in at least some of the recesses, wherein the electrically conductive material in each case forms a pin in the at least some recesses. This structure makes it possible to provide a filter arrangement for very high frequencies, because the structure allows the carrier plate and the pins arranged therein to be provided with very small geometrical dimensions.

11 Claims, 4 Drawing Sheets

(58) Field of Classification Search
USPC .............................................. 333/1, 236, 243
See application file for complete search history.

(56) References Cited

U.S. PATENT DOCUMENTS

| | | | | |
|---|---|---|---|---|
| 7,132,909 | B2 | 11/2006 | Mack | |
| 2005/0073463 | A1* | 4/2005 | Bayar | H01P 1/211 343/772 |

OTHER PUBLICATIONS

Guthart H. "A High-Power S-Band Filter (Correspondence)" IRE Transactions on Microwave Theory and Techniques, IEEE, USA, vol. 6, No. 2, Mar. 1, 1962 (Mar. 1, 1962), pp. 148-149, ISSN: 0097-2002, XP011219939.

Anonymous. "What is Via Filling?" May 20, 2020 (May 20, 2020), pp. 1-4, Retrieved from the Internet: https://www.pcbdirectory.com/community/what-is-via-filling [retrieved on Dec. 16, 2021] XP055873990, p. 1-p. 2.

Maas Susan et al. "Multi-layered substrate integrated waveguide waffle-iron filters" Jet Microwaves, Antennas & Propagation, the Institution of Engineering and Technology, United Kingdom, vol. 14, No. 10, Aug. 12, 2020 (Aug. 12, 2020), pp. 1038-1046 DOI: 10.1049/IET-MAP.2019.0886 ISSN: 1751-8725, XP006091663.

* cited by examiner

WAFFLE IRON FILTER ARRANGEMENT FOR HIGH-FREQUENCY SIGNALS

CROSS-REFERENCE TO RELATED APPLICATIONS

The present application is a national phase entry under 35 U.S.C. § 371 of International Application No. PCT/EP2021/079211 filed Oct. 21, 2021, published in German, which claims priority from German Application No. 10 2020 127 767.9 filed Oct. 21, 2020, the disclosures of which are incorporated herein by reference.

TECHNICAL FIELD

The present description relates to a filter arrangement for high-frequency signals (HF signals), that is used, for example, in communication equipment, in particular in conjunction with waveguides. Such communication equipment may be, for example, transmitting and/or receiving equipment.

TECHNICAL BACKGROUND

Signal filters are used in communication equipment to pass or suppress signal components in certain frequency ranges, such that substantially only the wanted signal components appear at an output of the filter and the unwanted signal components are removed or are very greatly attenuated.

Such signal filters are known in various designs and for a variety of application purposes. For example, signal filters may be constructed with discrete electronic components such as coils, capacitors and semiconductor elements. Especially for high frequencies, for example for several GHz and above, waveguides are used for signal processing and transmission. Also used in combination with waveguides are corresponding filters that do not require discrete electronic components.

In the case of waveguide filters (or also resonators) for high frequencies (e.g. in the K-band, 18 to 27 GHz and at higher frequencies), the structure and geometry of the waveguide and of the filter are determining factors for the filter function. In order to achieve a high quality of filter function, the structure, dimension and geometric design of the filter or resonator are therefore important.

DE 10 2012 020 576 A1, for example, describes a filter for a waveguide having adjustable coupling resonators and a frequency resonator.

Another example of a high-frequency resonator can be found in DE 10 2016 107 955 A1. Here, the tuning of the resonator is effected by means of a container that contains a liquid crystal, the container being at least partially accommodated in the resonator space.

DESCRIPTION

It may be regarded as an object to specify a filter for high frequencies that is characterized by a wide stopband in which the filter does not pass signals, or the attenuation of which is above a required attenuation level.

Specified according to a first aspect is a filter arrangement for high-frequency signals, HF signals. The filter arrangement comprises a housing and a waffle-iron arrangement. In the housing there is a cavity that extends in the longitudinal direction of the housing. The waffle-iron arrangement is arranged in the cavity and comprises a carrier plate. The carrier plate includes a plurality of recesses, wherein there is an electrically conductive material arranged in at least some of the recesses in order to form a pin arranged in the recess. The cavity of the housing includes two transformer portions and a waffle portion, wherein the waffle portion is arranged between the two transformer portions. The carrier plate is arranged in the waffle portion. The carrier plate includes a material that is permeable to HF signals.

In one embodiment, the housing is configured as an integral component or is formed from two half-shells.

For example, an integrally configured housing may be produced by use of 3D printing technology. Alternatively, the housing may be cast, or manufactured by use of another production technique, such that the cavity is inside the housing and accessible from at least one side to allow the carrier plate to be inserted and placed in its intended position.

Alternatively, the housing may comprise two half-shells, the second half-shell, when in an assembled state, being arranged on the first half-shell such that the cavity is located or formed between the first half-shell and the second half-shell.

Further on in the description, detailed reference is made to the variant of the housing composed of two half-shells. However, a person skilled in the art will understand that this reference is merely an example, and that the description also applies to other variants of the housing, i.e. in particular to the one-piece variant of the housing, such as may be produced, for example, by use of 3D printing technology. The function of the carrier plate and the arrangement of the carrier plate in the cavity of the housing is not dependent on whether the housing is of a one-piece or multi-piece design.

The cavity between the first and the second half-shell is designed in the manner of a channel, and extends from one end to the opposite end in the longitudinal direction of the filter arrangement, or of the half-shells, such that the cavity acts like a waveguide for HF signals. The cavity is of a lesser width than the half-shells, i.e. in the assembled state (i.e. when the first half-shell and the second half-shell are joined together), the half-shells touch or bear against each other next to the cavity.

The cavity is formed, for example, by milling or otherwise producing a corresponding depression in each of the faces of the two half-shells that are opposite or bear against each other when the filter arrangement is in the assembled state, such that these depressions form the cavity extending in the longitudinal direction of the filter arrangement when the half-shells are assembled, e.g. screwed or clamped, to each other via the faces provided for this purpose.

The waffle-iron arrangement is arranged in the cavity such that the cavity is divided into a plurality of portions along the longitudinal direction of the filter arrangement. The waffle-iron arrangement is arranged such that on either side thereof, along the longitudinal direction of the cavity, there is a portion between the waffle-iron arrangement and the respective end connectors of the filter arrangement. For example, the waffle-iron arrangement is arranged centrally in the longitudinal direction of the cavity, and the portions of the cavity on both sides of the waffle-iron arrangement are of equal length.

The cavity is thus divided into a waffle portion and two transformer portions, the waffle portion being located between the two transformer portions. Starting from a connector or an end of the filter arrangement, there is first a transformer portion, followed then by the waffle portion, which is followed by a further transformer portion that extends to the opposite end of the filter arrangement. The two transformer portions may be mirror-symmetrical with respect to the waffle portion.

The waffle-iron arrangement serves to pass or suppress HF signals propagating in the cavity of the filter arrangement. The filter function as such is thereby implemented.

The recesses in the carrier plate are designed, for example, as borings in the form of depressions or holes, and extend in the carrier plate in such a way that the recesses are perpendicular to the longitudinal direction of the cavity. Arranged in the recesses is an electrically conductive material that takes the form of pins. The pins, due to their geometry and position, then form teeth of the waffle iron in order to realize the filter function in the cavity.

The electrically conductive material may be placed in a liquid state in the recesses, where it then hardens to form the pins, which are held in position by the carrier plate.

The plurality of recesses may be arranged in the carrier plate, with regular or irregular spacing, in one or more rows. The carrier plate may have a multiplicity of recesses, of which all or only some may be filled with electrically conductive material, for example in order to achieve a desired filter function. Thus, a carrier plate may be designed according to requirements by filling the desired recesses and the desired number thereof with electrically conductive material. The carrier plate may have recesses that are not filled with electrically conductive material, for example in order to reduce or minimize the amount of carrier plate material that is in the cavity of the filter arrangement.

The half-shells are composed of or comprise an electrically conductive material, or a combination of such materials, such as aluminum, invar, copper or brass. The half-shells may be coated (for example with gold or silver) or chromated.

Usually, the teeth of a waffle-iron filter become smaller as the signal frequencies to be filtered with it become higher. If the signals to be processed are in the range of several gigahertz (GHz), e.g. in the K-band at about 20 GHz or above, the teeth of the waffle-iron filter have to be very small.

The filter arrangement and the waffle-iron arrangement, designed according to the principles described herein, allow the pins formed in the carrier plate to be produced to high precision with very small dimensions (down to a diameter or height of the pins of a few tenths or even hundredths of a millimeter), such that the waffle-iron arrangement may also be used at high frequencies (starting at 20 GHz up to 100 GHz or above). The carrier plate also imparts mechanical stability to the teeth, because the teeth are held as pins in the recesses of the carrier plate.

The shape, position and number of the respective pins are, as it were, a negative of the carrier plate with its recesses. The carrier plate is first provided with the corresponding recesses, as a printed circuit board. Then the material of which the pins are made is poured in a liquid state into the recesses, where the material hardens and where it also remains. The carrier plate, together with the pins, then forms the waffle-iron arrangement and is used in the filter arrangement. It is thus possible to provide a waffle-iron arrangement that is suitable for very high frequencies (20 GHz or higher) because the pins of the waffle-iron arrangement can be manufactured and used with the required (sometimes very small) size and dimensions.

According to one embodiment, the recesses in the carrier plate extend over an entire plate thickness of the carrier plate, wherein one pin completely fills the respective recess.

The recesses are, for example, borings that extend between two opposite surfaces of the carrier plate.

Preferably, the pins are flush with the surfaces of the carrier plate, i.e. the pins do not protrude from the carrier plate but still completely fill the recesses.

According to a further embodiment, the pins in the recesses contain an electrically conductive epoxy resin.

The epoxy resin may, for example, be electroplated with copper.

According to a further embodiment, at least some of the recesses in which the pins are arranged have a circular cross-section.

Accordingly, the pins also have a circular cross-section.

According to a further embodiment, a surface of the carrier plate from which the recesses extend into the carrier plate has a coating, wherein the coating comprises an electrically conductive material.

The coating thus forms a galvanic connection between the pins arranged in the recesses, such that the pins in combination implement the filter function. All pins are galvanically connected to one another and, according to their shape, position and arrangement, apply a filter function to high-frequency signals transmitted through the cavity.

According to a further embodiment, the waffle-iron arrangement is connected to the housing in such a way that the pins in the recesses are galvanically connected to the housing.

In terms of signal transmission technology in the high-frequency range, the pins and the housing or the half-shell galvanically connected to them form a unit. This structure basically has the same effect on high-frequency signals, which are transmitted via the cavity and are to be filtered, as if the pins were milled in the form of teeth into a surface of the half-shell.

The structure according to this embodiment may be implemented, for example, in that the surface of the carrier plate from which the recesses with the pins extend into the carrier plate is bonded in an electrically conductive manner to the first half-shell or to the housing. Preferably, the above-mentioned coating is provided on this surface of the carrier plate, such that the carrier plate is bonded in an electrically conductive manner, at the surface of the coating, to the first half-shell or to the housing.

The pins are indirectly or directly galvanically connected to the housing or to the first half-shell. An example of an indirect galvanic connection is the galvanic connection by bonding of the coating to the housing or to the first half-shell. An alternative example, of a direct galvanic connection, would be for each of the pins to be individually bonded to the housing or to the first half-shell by means of electrically conductive adhesive, for example in that a predetermined amount of adhesive is applied to each pin and then the carrier plate is pressed against a surface of the cavity in the housing or a surface of the first half-shell, and is thereby bonded.

According to a further embodiment, the waffle-iron arrangement is bonded to the housing by means of an adhesive layer comprising an electrically conductive adhesive.

For example, an epoxy adhesive or a silicone adhesive that vulcanizes at room temperature may be used as the adhesive.

The carrier plate contains a material that is permeable to HF signals. For example, the carrier plate is a printed circuit board that permeable to HF signals.

The carrier plate is made, in particular, of high-quality printed circuit board material that is suitable for HF, such as, for example, reinforced Teflon. The carrier plate is a dielectric that is characterized by low dielectric losses and has a high permeability for HF signals. Such high-quality materials have low losses, therefore having less conversion of HF energy into heat, and ideally their dielectric properties are very close to the dielectric properties of a vacuum. Consequently, the waffle-iron arrangement can fulfill the filtering function required of it for HF signals, because the HF signals pass through the material for HF signals without any significant influence on the HF signals, and the waffle-iron can exert its proper influence upon the HF signals. The carrier plate surrounds the teeth of the waffle-iron arrangement and protects the waffle-iron itself and the pins of electrically conductive material from external mechanical stress, which is advantageous in particular for teeth of a waffle-iron filter with very small dimensions for high frequencies.

According to a further embodiment, the filter arrangement additionally comprises a second waffle-iron arrangement, which is connected to the housing. The second waffle-iron arrangement is opposite the first waffle-iron arrangement and is spaced apart from the first waffle-iron arrangement by a predefined distance.

As regards the design of the second waffle-iron arrangement, the same applies as described above with reference to the (first) waffle-iron arrangement. The explanations given there apply analogously to the second waffle-iron arrangement and are not repeated here. Similarly, the same applies to the connection between the second waffle-iron arrangement and the housing or the second half-shell as has been explained with reference to the connection between the (first) waffle-iron arrangement and the housing or the first half-shell. In any case, the two waffle-iron arrangements are attached to mutually opposite faces of the cavity of the housing, this applying both to a one-piece housing or a housing composed of two (or more) half-shells.

The combination of the first and the second waffle-iron arrangement realizes the filter function in the cavity between the two half-shells, there being a respective transformer portion located between the combination of the two waffle-iron arrangements and each of the two opposite end faces of the filter arrangement.

According to a further embodiment, the pins of the waffle-iron arrangement extend in the direction of the second waffle-iron arrangement.

The filter arrangement as described herein may be used, for example, in signal processing units or signal transmission units in communication equipment, for example in communication satellites or other components of signal transmission links.

The structure of the filter arrangement as described herein allows a high degree of miniaturization of waffle-iron filters, and thus their use for very high frequencies.

BRIEF DESCRIPTION OF THE FIGURES

In the following, exemplary embodiments are described in more detail on the basis of the appended drawings. The representations are schematic and not to scale. Elements that are the same or similar are denoted by the same reference signs. In the drawings.

DETAILED DESCRIPTION OF EXEMPLARY EMBODIMENTS

Figure 1:
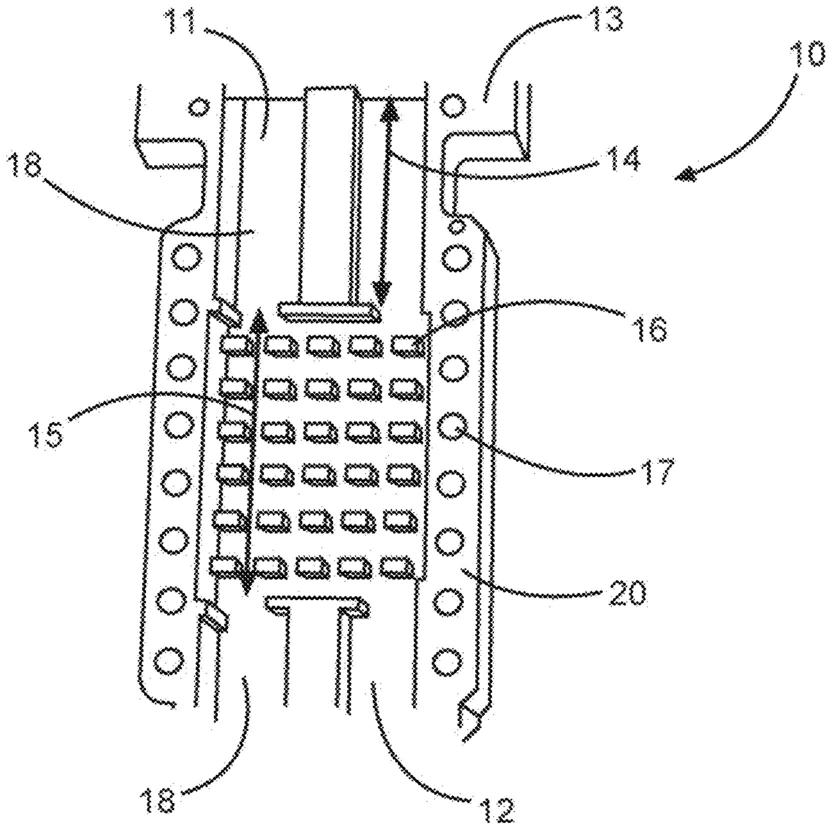
Fig. 1 (PRIOR ART)
FIG. 1 shows a schematic representation of a part of a waffle-iron filter.

Shown schematically in FIG. 1 is the typical structure of a half-shell 20 of a filter arrangement 10 in a waffle-iron structure. Usually, a filter arrangement is composed of two such half-shells 20 joined together at the surface that faces toward the viewer, such that a cavity (or two such cavities 18, as shown in FIG. 1, extending from bottom to top) and a waffle-iron structure is are realized between the half-shells.

The half-shell 20 has a first connector 11 (the end at the top in the representation) and a second connector 12 (the end at the bottom in the representation). An external waveguide is connected to these connectors 11, 12, but is not shown in FIG. 1. The connectors 11, 12 each have a flange 13 to which a respective waveguide may be connected.

Starting from the first connector 11 and the second connector 12, a cavity (or, also, two cavities) extends (extend) toward the waffle portion 15, the cavity 18 forming a transformer portion 14 on both sides of the waffle portion 15. The waffle portion 15 has a multiplicity of teeth 16. The dimensions of the teeth 16 decrease as the frequency of the signals to be processed increases. In the example of FIG. 1, the teeth and the entire structure of the half-shell are milled into a metallic block. However, as the size of the teeth 16 decreases, greater demands are placed on the production of the tooth structure in the waffle portion 15, because at very high frequencies the teeth may have cross-sections of a few tenths or hundredths of a square millimeter.

Arranged along the half-shell 20 are a number of recesses 17 that enable the two half-shells to be assembled, for example by the insertion and fastening of screws in these recesses 17.

The transformer portion 14 has a cross-section that tapers from the ends toward the waffle portion 15.

Given this general description of a waffle-iron filter structure of FIG. 1, alternative structures of a filter arrangement are now described with reference to FIGS. 2 to 7.

Figure 2:
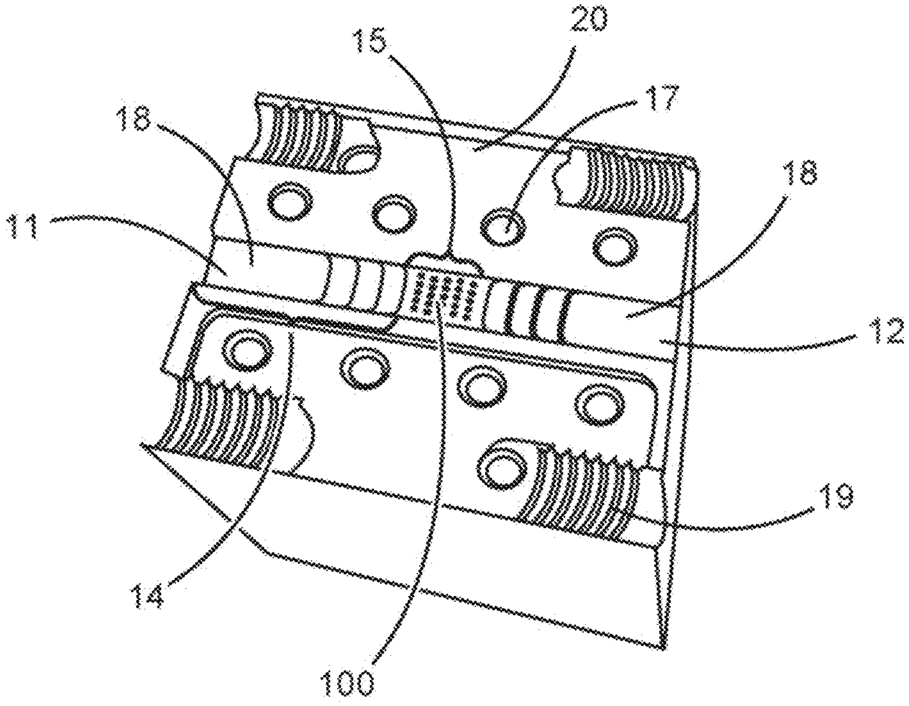
FIG. 2 shows a schematic representation of a half-shell of a filter arrangement according to an exemplary embodiment.

FIG. 2 shows a schematic representation of a half-shell 20. There are two fasteners 19 arranged at each of the ends, on the left and right, for the purpose of connecting an external waveguide (not shown) to the filter arrangement. In this example, the fastenings are internally threaded borings. However, it is of course possible to select other types of fastening, for example clamp connections or other suitable types of connection.

The cavity 18 extends centrally in the half-shell from left to right, starting from the first connector 11 and toward the second connector 12, initially forming a transformer portion 14, this transformer portion leading into the waffle portion 15, which is again followed by a transformer portion.

The transformer portions 14 are designed in such a way that their cross-section reduces from the respective end face to the waffle portion 15. In this case, this is achieved in that the depth of the cavity decreases nearer to the waffle portion 15. Arranged for this purpose in the example of FIG. 2 are a plurality of steps, the height of which increases the closer they are arranged to the wafer portion 15. This change in the cross-section already filters out some signal components of the signal.

A waffle-iron arrangement 100 is arranged in the waffle portion 15 and is electrically conductively connected to the half-shell, namely on the underside of the waffle-iron arrangement 100.

Figure 3:
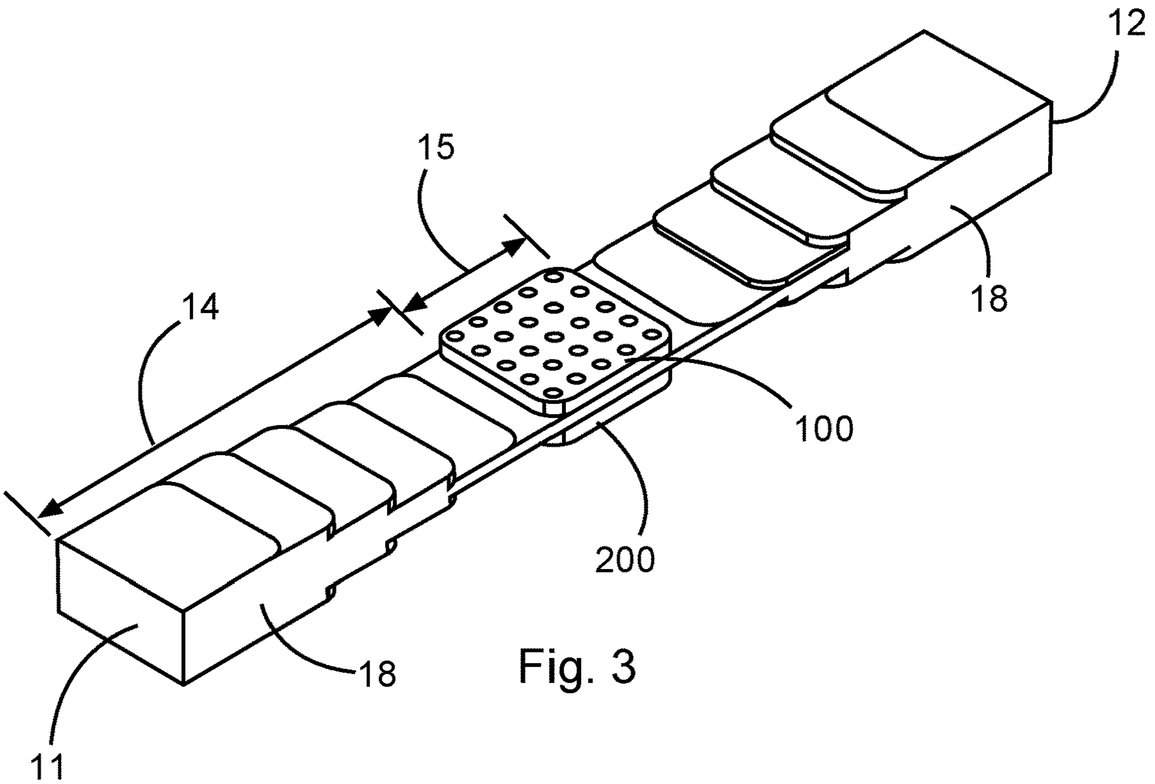
FIG. 3 shows a schematic representation of the cavity and two waffle-iron arrangements of a filter arrangement according to a further exemplary embodiment.

FIG. 3 shows a detailed representation of the cavity 18 (represented here as a negative without the surrounding half-shells) and of two waffle-iron arrangements 100, 200. The cavities 18 located on both sides of the waffle-iron arrangements 100, 200 show a tapering cross-section starting from the first connector 11, or the second connector 12, in the direction of the waffle-iron arrangements 100, 200. The transformer portions 14 of the cavity 18 may be of the same design in respect of their dimensions and shape.

Between the transformer portions 14, the waffle portion 15 is arranged with two waffle-iron arrangements 100, 200. The waffle-iron arrangements are each connected in an electrically conductive manner to a half-shell and are spaced apart from each other.

Figure 4:
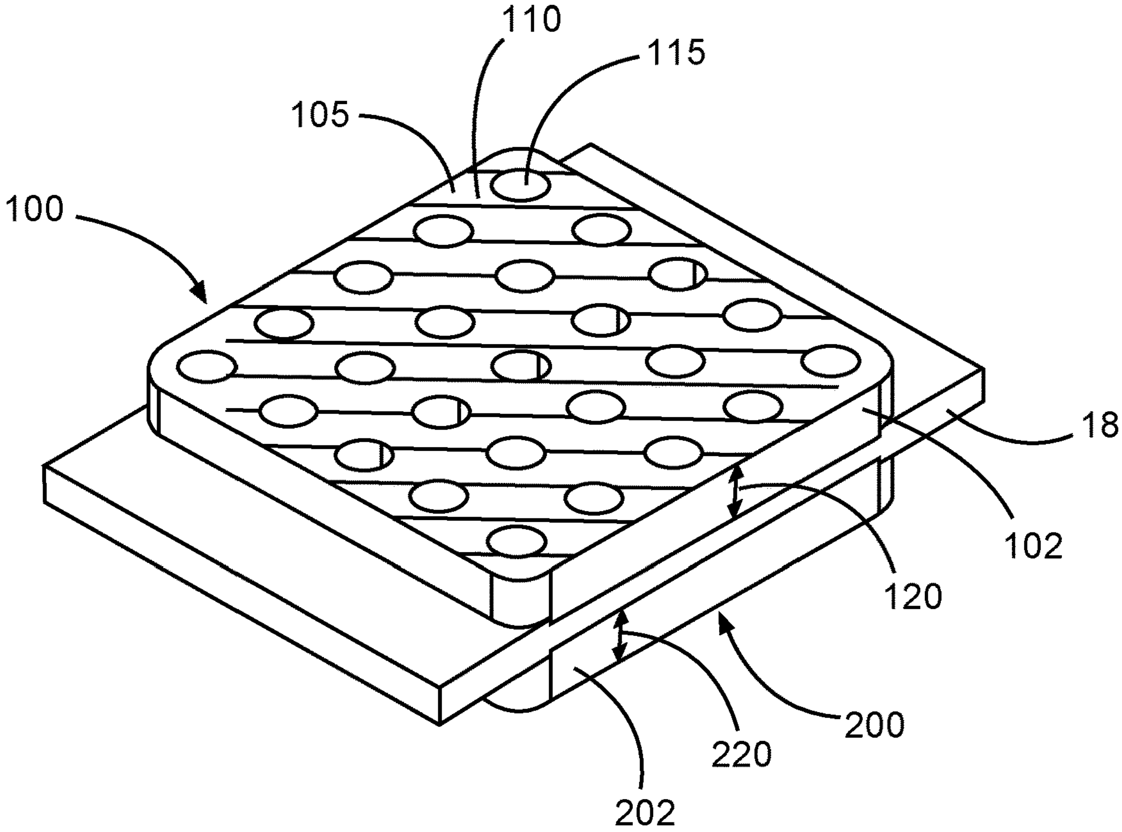
FIG. 4 shows a schematic representation of two waffle-iron arrangements of a filter arrangement according to a further exemplary embodiment.

FIG. 4 shows a detailed representation of the two waffle-iron arrangements 100, 200 from FIG. 3. Each waffle-iron arrangement 100, 200 has a carrier plate 102, 202 having a corresponding plate thickness 120, 220. It can be seen that the two waffle-iron arrangements 100, 200 do not touch, but are spaced apart by a predefined distance, such that the cavity 18 extends between them. The first waffle-iron arrangement 100 is described here, the second waffle-iron arrangement being of a similar structure.

The waffle arrangement 100 comprises a carrier plate 102, which may be, for example, a printed circuit board (PCB). The carrier plate may have side lengths of a few millimeters. A plurality of recesses 115 are arranged in the carrier plate 102, extending over the entire thickness 120 of the plate from one surface 105 to the opposite surface at the cavity 18. An electrically conductive material is inserted into the recesses 115 in order to form the teeth of the waffle-iron filter.

The surface 105 of the carrier plate 102 is the face that is fastened to the half-shell. In this example, the surface 105 has a metallic coating, the coating 110 being represented as hatching to reveal the structure of the carrier plate 102 with the recesses 115. The coating 110 thus constitutes a metallic plane on the surface 105 of the carrier plate 102. The coating 110 is galvanically connected to the teeth in the recesses 115.

It is to be noted that the number and arrangement of the recesses in the representation of FIG. 4 has been selected merely by way of example. Both the number and the arrangement of the recesses can be freely selected in dependence on the required filter properties of the filter arrangement.

Figure 5:
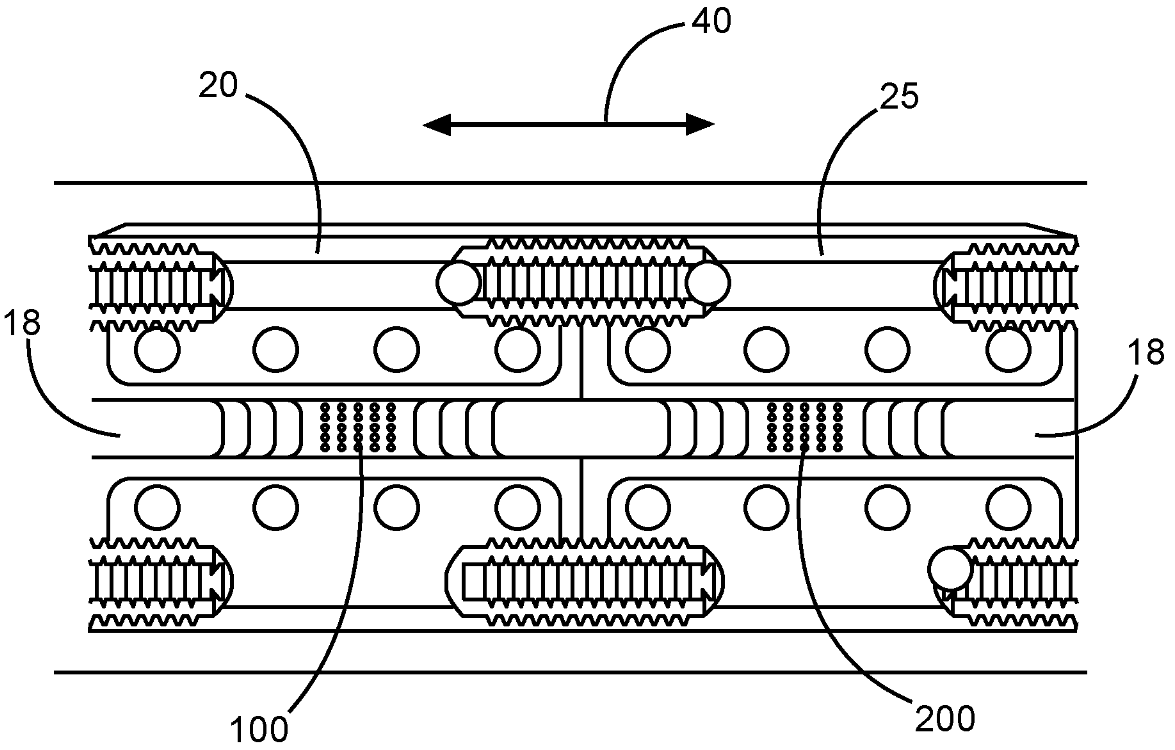
FIG. 5 shows a schematic representation of two half-shells of a filter arrangement according to a further exemplary embodiment.

FIG. 5 shows a schematic representation of the first half-shell 20 and the second half-shell 25 when the filter arrangement is in a non-assembled state. The first waffle-iron arrangement 100 is arranged centrally in the first half-shell 20, and the second waffle-iron arrangement 200 is arranged centrally in the second half-shell 25 is, such that the two waffle-iron arrangements are opposite each other when the second half-shell 25 is assembled with the first half-shell 20. The cavity 18 extends along the half-shells 20, 25 in the longitudinal direction 40.

Figure 6:
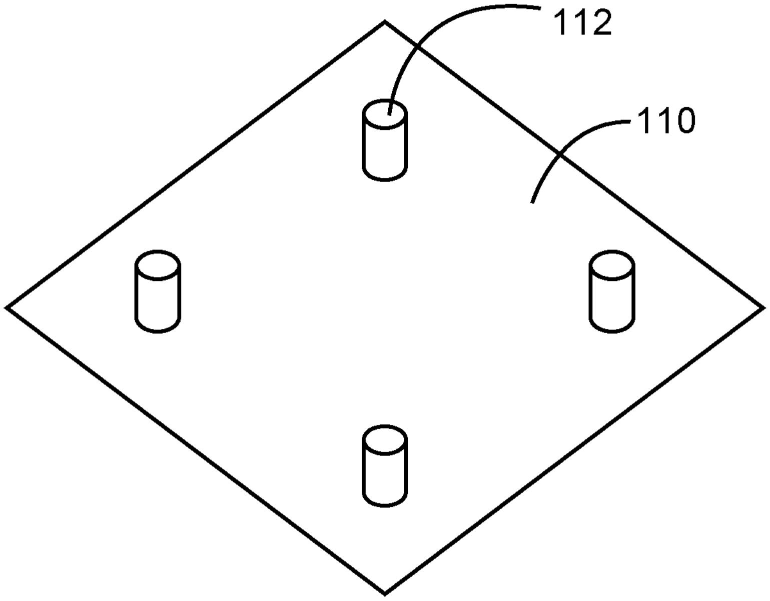
FIG. 6 shows a schematic representation of the pins and the coating of a waffle-iron arrangement for a filter arrangement according to a further exemplary embodiment.

FIG. 6 shows a schematic representation of the metallic coating 100 and of the pins 112 of the waffle-iron arrangement 100. This is the negative of the carrier plate 102, although for illustrative and simplification purposes only four pins 112 are shown in FIG. 6. The coating 110 forms a continuous planar element along the surface 105. The pins 112 adjoin the coating and extend perpendicularly with respect to it. Accordingly, the recesses 115 also extend perpendicularly with respect to the surface 105.

Figure 7:
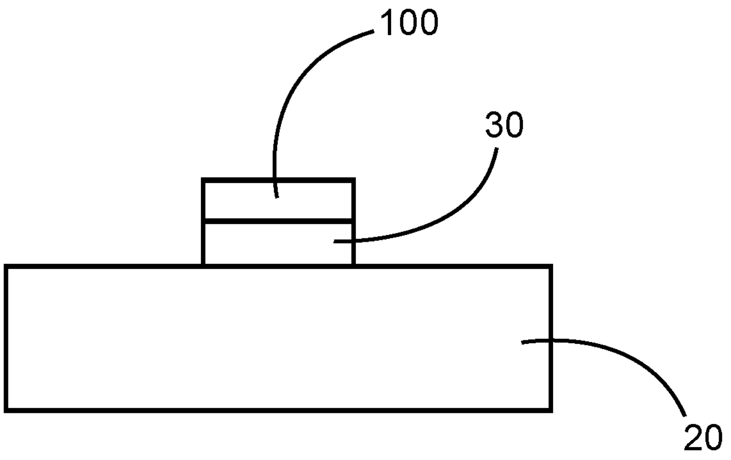
FIG. 7 shows a schematic representation of a half-shell with adhesive layer and waffle-iron arrangement for a filter arrangement according to a further exemplary embodiment.

Shown schematically in FIG. 7 is the connection between the half-shell 20, the adhesive layer 30 and the waffle-iron arrangement 100. The rest of the structure of the half-shell has not been shown here. In any case, the waffle-iron arrangement 100 is bonded in an electrically conductive manner to the half-shell 20 by means of an adhesive layer 30, namely at the point that forms the waffle portion 15 in FIG. 2.

The filter arrangement 10 as described herein enables the waffle-iron filter structure to be used for high frequencies at 20 GHz and above. Waffle-iron filters used as low pass filters have advantageous properties because they have a very high return frequency at which they again become permeable to high-frequency signals. However, a disadvantage for conventional waffle-iron filters as shown in FIG. 1 is that they cannot easily be manufactured for high frequencies because the tooth structure cannot be manufactured in the required geometries for high frequencies. With the structure described here, however, it is easy to offer a waffle-iron filter even for frequencies in the HF range, because this structure affords a particularly precise and miniaturized shape of the waffle-iron arrangement.

In addition, it is to be noted that "comprising" or "having" does not exclude other elements or steps, and "one" or "a/an" does not exclude a multiplicity. Further, it is to be noted that features or steps that have been described with reference to any of the above exemplary embodiments may also be used in combination with other features or steps of other exemplary embodiments described above. Reference signs in the claims are not to be regarded as a limitation.

LIST OF REFERENCES

10 filter arrangement, waffle-iron filter
11 first connector
12 second connector
13 flange
14 transformer portion
15 waffle portion
16 tooth
17 recess
18 cavity
19 fastening
20 first half-shell
25 second half-shell
30 adhesive layer
40 longitudinal direction
100 waffle-iron arrangement
102 carrier plate
105 surface
110 coating
112 pin
115 recess
120 plate thickness
200 waffle-iron arrangement
202 carrier plate
220 plate thickness

The invention claimed is:

1. A filter arrangement for high-frequency signals (HF-signals) comprising:

a housing having a cavity extending in a longitudinal direction of the housing;

a waffle-iron arrangement arranged in the cavity;

wherein the waffle-iron arrangement comprises:

a carrier plate having a plurality of recesses; and an electrically conductive material arranged in at least some of the plurality of recesses, wherein the electrically conductive material in each case forms a pin in the at least some recesses;

wherein the cavity of the housing includes two transformer portions and a waffle portion, wherein the waffle portion is arranged between the two transformer portions;

wherein the carrier plate is arranged in the waffle portion;

wherein the carrier plate includes a material that is permeable to the HF signals.

2. The filter arrangement as claimed in claim 1, wherein the plurality of recesses in the carrier plate extend over an entire plate thickness of the carrier plate;

wherein each of the pins completely fills the respective one of the plurality of recesses.

3. The filter arrangement as claimed in claim 1, wherein the pins in the recesses contain an electrically conductive epoxy resin.

4. The filter arrangement as claimed in claim 1, wherein at least some of the plurality of recesses in which the pins are arranged have a circular cross-section.

5. The filter arrangement as claimed in claim 1, wherein a surface of the carrier plate from which the plurality of recesses extend into the carrier plate has a coating;

wherein the coating comprises an electrically conductive material.

6. The filter arrangement as claimed in claim 1, wherein the waffle-iron arrangement is connected to the housing in such a way that the pins in the recesses are galvanically connected to the housing.

7. The filter arrangement as claimed in claim 1, wherein the waffle-iron arrangement is bonded to the housing by an adhesive layer comprising an electrically conductive adhesive.

8. The filter arrangement as claimed in claim 1, wherein the carrier plate is a printed circuit board that is permeable to the HF signals.

9. The filter arrangement as claimed in claim 1, further comprising a second waffle-iron arrangement connected to the housing;

wherein the second waffle-iron arrangement is opposite the first waffle-iron arrangement and is spaced from the first waffle-iron arrangement by a predefined distance.

10. The filter arrangement as claimed in claim 9, wherein the pins of the waffle-iron arrangement extend in a direction of the second waffle-iron arrangement.

11. The filter arrangement as claimed in claim 1, wherein the housing is an integral housing or is composed of two half-shells.

* * * * *